United States Patent [19]
VandenBerg

[11] Patent Number: 5,833,179
[45] Date of Patent: Nov. 10, 1998

[54] PIPE BRACKET

[76] Inventor: Lester J. VandenBerg, 6775 Scott Lake Dr., Comstock Park, Mich. 49321

[21] Appl. No.: 639,038

[22] Filed: Apr. 16, 1996

[51] Int. Cl.$^6$ ................................................ F16L 3/22
[52] U.S. Cl. ................................. 248/65; 248/68.1
[58] Field of Search ................... 248/68.1, 71, 74.2, 248/300, 65, 316.7, 57, 113; 165/162; 4/695; 403/315, 316, 319; 138/106, 107

[56] References Cited

U.S. PATENT DOCUMENTS

| | | |
|---|---|---|
| 901,179 | 10/1908 | Kunkel .................................... 248/113 |
| 2,140,441 | 12/1938 | Clark . |
| 2,675,978 | 4/1954 | Brown . |
| 2,751,652 | 6/1956 | Epstein . |
| 2,896,887 | 7/1959 | Beltz . |
| 2,997,265 | 8/1961 | Weiss . |
| 3,216,025 | 11/1965 | Roll ..................................... 248/68.1 X |
| 3,366,356 | 1/1968 | Fisher . |
| 3,397,431 | 8/1968 | Walker . |
| 3,437,297 | 4/1969 | Jirka et al. . |
| 3,809,350 | 5/1974 | Lane . |
| 4,108,408 | 8/1978 | Butti ....................................... 248/68.1 |
| 4,184,862 | 1/1980 | Waters ............................... 165/162 X |
| 4,550,451 | 11/1985 | Hubbard . |
| 4,907,766 | 3/1990 | Rinderer . |
| 4,909,461 | 3/1990 | Collins . |
| 5,050,824 | 9/1991 | Hubbard . |
| 5,060,892 | 10/1991 | Dougherty . |
| 5,136,985 | 8/1992 | Krowech ............................ 165/162 X |
| 5,184,792 | 2/1993 | Bernhard et al. .......................... 248/71 |
| 5,267,710 | 12/1993 | Condon . |

Primary Examiner—Ramon O. Ramirez
Assistant Examiner—Long Dinh Phan
Attorney, Agent, or Firm—Price, Heneveld, Cooper, Dewitt & Litton

[57] ABSTRACT

A stubout bracket for positioning and supporting pipes between building supports in a building wall includes a bar which is sized to extend between two building supports in a building wall, and includes at least one notch on a longitudinal side edge of the bar, and first and second crimpable rings located on opposite sides of the notch, whereby a pipe or fitting inserted into the notch can be secured to the bracket by crimping the rings.

17 Claims, 1 Drawing Sheet

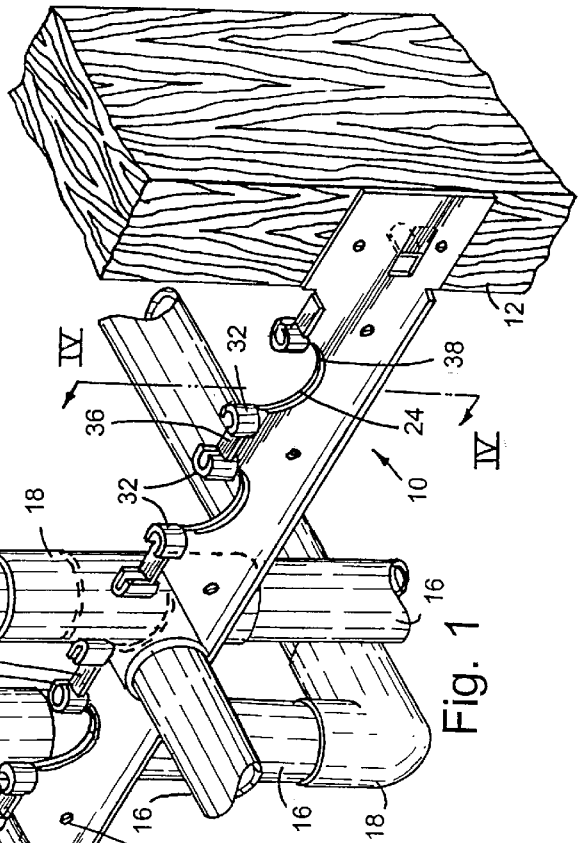
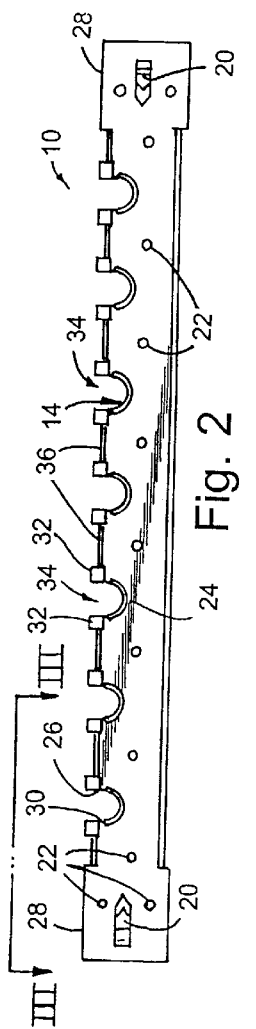
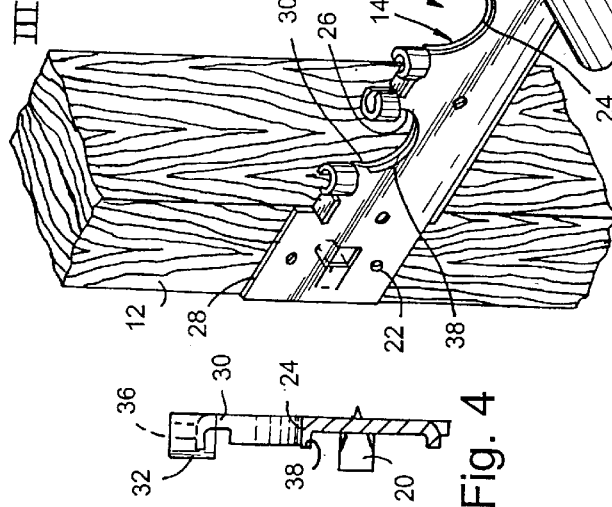
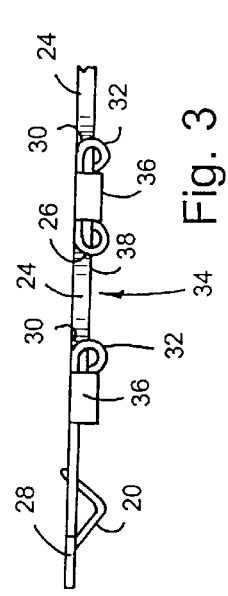

PIPE BRACKET

BACKGROUND OF THE INVENTION

This invention relates to pipe brackets and more particularly to stubout brackets for positioning and supporting water pipes between studs in a building wall.

Water supply pipes adapted to be connected to plumbing fixtures such as sinks, lavatories, water closets, and the like, typically extend vertically between building studs of a wall. During construction or renovation, before the pipes are connected to a plumbing fixture, the pipes are typically roughed in by using a horizontal bracket member, generally known as a stubout bracket, which is nailed or otherwise fastened at opposite ends thereof to adjacent building studs. Conventional stubout brackets are comprised of a metal strap, typically copper or copper plated, having a plurality of uniformly spaced apart circular openings cut therein. The water supply pipes are inserted through the openings and typically soldered to the openings in the stubout bracket to securely position and support the pipes to prevent lateral, vertical and axial movement thereof. A disadvantage with conventional stubout brackets having circular openings is that the step of soldering the pipes to the bracket to prevent axial movement of the pipes with respect to the bracket is relatively time consuming. A further disadvantage of conventional stubout brackets is that they are not suited for supporting plastic or other non-metallic pipes which cannot be brazed or soldered. In particular, in order to prevent axial movement of plastic pipes supported by a conventional stubout bracket, special inserts are typically used which must be slipped over the end of the pipe and forced between the pipe and the peripheral edges of the stubout bracket defining the openings therein. Thus, additional parts and time consuming steps are needed to securely position and support plastic or other non-metallic pipes using conventional stubout brackets.

U.S. Pat. No. 4,909,461 to Collins discloses a stubout bar having notches instead of holes for holding plastic or metal pipes. The base of the notch is formed by a flange that comprises an arc of more than 180 degrees which pinches the pipe as it is snapped into place. This arrangement was intended to overcome some of the disadvantages of conventional stubout brackets by allowing the pipes to be easily snapped into place without having to solder the pipe to the bracket. The bracket design described by Collins, however, has some notable disadvantages. First, because the base of the notch is formed by a flange that comprises an arc of more than 180 degrees, which pinches the pipe as it is snapped into place, the minimum clearance between the edges defining the notch is less than the diameter of the pipe for which the bracket is designed. As a result, when a pipe is snapped into a notch on the bracket described by Collins, the edges of the notch tend to gouge the pipe. Such damage to the pipe is undesirable and could affect the integrity of the pipe. If the minimum clearance between the edges of the notch is decreased, the damage would become more pronounced, and it also would become more difficult to snap the pipe into the notch. In order to minimize the gouging effect and make it easier to snap the pipe into the notch, it is possible to design the bracket disclosed by Collins so that the minimum clearance between the edges of the notch is only slightly less than the diameter of the pipe. However, as the minimum clearance between the edges of the notch is increased, the ability of the stubout bracket to hold the pipe in place is reduced. Therefore, with the stubout bracket disclosed by Collins, there is an inherent trade-off between optimization of the extent to which the pipe can be firmly held in position, and minimization of the gouging effect and effort needed to snap the pipe into the notch.

Another disadvantage of the stubout bracket described by Collins is that because of the criticality of the minimum clearance of the edges of the notch, the bracket is not suited for alternatively holding either a standard size pipe (typically half inch) or a standard size fitting (such as an elbow or tee) because of the difference in the outer diameter of the fitting as compared with the outer diameter of the pipe. Specifically, if the notches are designed to hold half inch pipe, then they will not be readily adapted for use in holding half inch fittings. This type of bracket requires positioning the fitting portion of the plumbing into the stud space beyond the bracket about ½" farther than the stud face. This then creates a problem by forcing the water pipes into the way of the horizontal drain pipes that often pass behind the water pipes in the same tight stud space. The ability to support either a standard size pipe or an associated fitting is highly desirable because it is often necessary, or at least extremely convenient, to support a fitting, rather than pipe, on the stubout bracket, in order to make a 90 degree turn in a minimum amount of space within a building wall.

H. E. Weis (U.S. Pat. No. 2,997,265), discloses a bracket with bendable swing over tabs which are bent into position over the pipe. The tabs, which project outwardly, are inherently impractical because a narrow profile in a plumbing bracket is necessary to allow dry wall to be installed on the stud surface. Use of such brackets would require bending every unused tab inwardly.

SUMMARY OF THE INVENTION

The invention pertains to an improved stubout bracket which allows pipes to be quickly, easily and securely positioned and supported between building supports in a building wall without having to solder the pipes to the bracket, and without scratching or gouging the pipes. The invention also allows plastic and other non-metallic pipes to be quickly, easily and firmly secured and supported between building supports in a building wall without scratching, gouging or otherwise damaging the plastic pipes, and without using additional parts such as inserts. Further, the stubout bracket of the invention is adapted for positioning and supporting either pipes or fittings between building supports in a building wall. The invention thus provides a higher degree of flexibility in application than known stubout brackets.

The objectives and advantages of the invention are achieved by a stubout bracket generally including a strap or bar which is sized to extend between two building supports in a building wall, and includes at least one notch on a longitudinal side edge of the bar. The bar includes first and second crimpable rings located on opposite sides of the notch, for securing a pipe or fitting when the crimpable rings are crimped.

BRIEF DESCRIPTION OF THE DRAWINGS

FIG. 1 is an perspective view showing the use of a stubout bracket in accordance with the invention attached to building studs of a building wall and supporting pipes and fittings;

FIG. 2 is a front elevational view of the bracket shown in FIG. 1;

FIG. 3 is a side elevational view of the bracket shown in FIG. 1; and

FIG. 4 is a top plan view of the bracket shown in FIG. 1.

DETAIL DESCRIPTION OF THE PREFERRED EMBODIMENT

With reference to FIG. 1, a stubout bracket 10 is shown secured at opposite ends thereof to adjacent building supports or studs 12 of a building wall. The stubout bracket includes a plurality of uniformly spaced apart notches 14 for positioning and supporting pipe 16 or fittings 18. Stubout bracket 10 is preferably made of a metal, and most preferably a solderable metal, such as copper or a copper alloy, although other materials may be suitably employed without departing from the scope of the invention.

As shown in FIGS. 2, 3 and 4, the stubout bracket 10 can be provided with integral fasteners 20 which can be hammered into studs to permanently fastened the stubout bracket 10 to the studs. Alternatively, or in conjunction with the integral fasteners 20, the stubout bracket 10 can be provided with fastener apertures 22 through which nails, screws, rivets or the like may be driven for attaching or further supporting the stubout bracket 10 to the studs 12.

The notches 14 are preferably semi-circular or U-shaped, with the minimum clearance between the edges of the notches being at least equal to the diameter of the pipe or fittings which are to be supported by the stubout bracket, so that the pipe 16 or fittings 18 are not scratched or gouged during insertion thereof into notches 14. With the illustrated embodiment, each notch is at least partially defined by a generally arcuate edge of substantially constant curvature which extends through an arc of about 180 degrees or slightly less. In particular, each notch is defined by a first substantially semi-circular edge segment 24, by a second edge segment 26 which extends from one end of the semi-circular edge segment to the longitudinal side edge 28 of the stubout bracket 10, and by a third edge segment 30 which extends from the other end of the semi-circular edge segment 24 to the longitudinal side edge 28 of the stubout bracket 10. The minimum distance between the second and third segments, 26 and 30 respectively, is about at least equal to the distance between the ends of the semi-circular edge segment, whereby a pipe or fitting can be inserted into the notch 14 without scratching or gouging the pipe or fitting. In the illustrated embodiment, the second and third edge segments are substantially linear and parallel. In particular, with the illustrated embodiment, the second edge segment 26 and third edge segment 30 together with the semi-circular edge segment 24 form a U-shaped notch 14. The substantially semi-circular edge segment 24 preferably has a radius which is about equal to or slightly greater than the outer radius of a fitting associated with a pipe which the bracket is adapted to support. For example, the most commonly used water pipe size for residential buildings is one-half inch. In the case of a stubout bracket adapted to support either one-half inch pipe or the associated one-half inch fittings, the substantially semi-circular edge segment 24 preferably has a radius of from about 0.33 inches to about 0.35 inches, so that half inch pipe (typically having an outer diameter of about 0.6 inches) or a half inch pipe fitting (typically having an outer diameter of about 0.67 inches) can be easily inserted into the notch 14 without scratching or gouging the pipe or fitting.

As shown in the illustrated embodiment, first and second crimpable rings 32 are located on opposite sides of each of the notches 14. The crimpable rings 32 allow a pipe or fitting which is inserted into one of the notches 14 to be secured to the stubout bracket 10 by crimping the rings. In order to reduce manufacturing costs, to provide improved convenience, and to increase reliability, the crimpable rings 32 are preferably integral with the stubout bracket, as shown in the illustrated embodiment. The illustrated crimpable rings are formed from an integral portion of the bar which is coiled about an axis which is approximately parallel to, or within, a plane defined by the length and width of the stubout bracket, and which is approximately perpendicular to the longitudinal side edge of the bracket.

In order to insure that the crimpable rings 32 will project into the entrance zone 34 of the notches 14 when compressive forces are applied to the crimpable rings in a direction approximately perpendicular to the plane defined by the length and width of the stubout bracket, a brace 36 is disposed approximately adjacent to each of the crimpable rings 32. The braces 36 are preferably an integral portion of the stubout bracket which extends perpendicularly from the plane defined by the length and width of the stubout bracket.

The rings are preferably located above the semi-circular edge segment 24 of the notch 14.

The stubout bracket in accordance with the invention can be easily made, for example, from sheet metal materials using conventional metal stamping, cutting and progressive die processes.

The stubout bracket in accordance with the invention is utilized by positioning the stubout bracket 10 at a desired location so that the stubout bracket is horizontally arranged with respect to its length, with the notches 14 facing upwardly, and with the ends of the stubout bracket abutting adjacent building supports 12. After the stubout bracket is properly positioned, it is fastened to the building supports 12 using fasteners which pass through fastener apertures 22, integral fasteners 20, or a combination thereof. Thereafter, a pipe 16 or fitting 18 is inserted into one of the notches 14, with the semi-circular edge segment (bottom of the notch) supporting the pipe or fitting, and with the pipe or fitting properly positioned in the notch, the crimpable rings 32 are deformed by applying compressive forces upon the crimpable rings in opposite directions which are approximately perpendicular to the plane defined by the length and width of the stubout bracket. The compressive forces cause the crimpable rings 32 to flatten out and expand into the entrance zone 34 of the notch 14 and engage the outer surface of the pipe or fitting to secure the pipe or fitting to the bracket 10. The crimpable rings can be quickly and easily crimped using hand-held tools such as pliers, channel locks, or the like. For example, with a channel locks or pliers, the rings are crimped or flattened and so expand inward to an amount depending on the amount of pressure applied. This then allows for the ability to lock in two different sizes firmly. This also allows the fitting to be placed in the bracket close to the stud face directly behind the drywall out of the way of the drain piping. Because the plumbing fittings have a slightly narrowed neck behind what is called the bell of the fitting, the crimpable rings are preferably slightly offset from the plane of the bracket to enable the bracket to slip around the narrow neck of the fitting.

In order to enhance support of a pipe or fitting on the bracket, the notches 14 can be provided with peripheral flanges 38.

As is evident from the foregoing disclosure, the invention provides a simple stubout bracket with few components, which allows metal and/or non-metal pipes and/or fittings to be quickly and easily positioned and securely supported in a building wall, without requiring any brazing or soldering, and without causing any scratching or gouging of the pipe or fittings.

It will be apparent to those skilled in the art that various modifications to the preferred embodiment of the invention as described herein can be made without departing from the spirit or scope of the invention as defined by the appended claims.

The embodiments of the invention in which an exclusive property or privilege is claimed are defined as follows:

1. A stubout bracket adapted to support a pipe or fitting, comprising:

a bracket body including a sheet of material having a peripheral edge;

a notched out area recessed into the peripheral edge of the sheet of material, the notched out area having an entrance zone adapted to receive the pipe or fitting;

a crimpable ring located adjacent the edge of the sheet of material of which the bracket body is comprised, the crimpable ring being positioned immediately adjacent the notched out area and being coiled about an axis approximately perpendicular to the peripheral edge; and wherein the pipe or fitting is securable in the notched out area by compressing the crimpable ring in a first direction and expanding the crimpable ring in a second direction toward the entrance zone of the notched out area such that the crimpable ring engages an outer surface of the pipe or fitting.

2. The stubout bracket of claim 1, wherein the notched out area is substantially semi-circular.

3. The stubout bracket of claim 1, wherein the notched out area is substantially U-shaped.

4. The stubout bracket of claim 1, wherein the notched out area is at least partially defined by a generally arcuate edge of substantially constant curvature which extends through an arc of about 180 degrees or less.

5. The stubout bracket of claim 1, wherein the notched out area is defined by a first substantially semi-circular edge segment, by a second edge segment extending from one end of the semi-circular edge segment to the peripheral edge of the bracket body, and by a third segment extending from another end of the semi-circular edge segment to the peripheral edge of the bracket body, the minimum distance between the second and the third segment being about at least equal to the distance between the ends of the semi-circular edge segment, whereby the pipe or fitting is receivable in the notched out area without scratching or gouging the pipe or fitting.

6. The stubout bracket of claim 5, wherein the substantially semi-circular edge segment of the notched out area has a radius about equal to the outer radius of the fitting which the bracket is adapted to support.

7. The stubout bracket of claim 5, wherein the bracket is adapted to position and support half inch pipe and the substantially semi-circular edge segment of the notched out area has a radius of from about 0.33 inches to about 0.35 inches.

8. The stubout bracket of claim 1, wherein the crimpable ring is integral with the bracket body.

9. The stubout bracket of claim 8, wherein the crimpable ring is coiled about an axis which is approximately perpendicular to the peripheral edge of the bracket body.

10. The stubout bracket of claim 1, wherein the notched out area includes a peripheral flange which extends approximately perpendicular from a plane defined by a length and a width of the sheet of material of which the bracket body is comprised.

11. The stubout bracket of claim 1, wherein the bracket includes a brace disposed approximately adjacent to the crimpable ring, whereby compressive forces exerted on the crimpable ring cause at least a portion of the crimpable ring to project into the notched out area.

12. The stubout bracket of claim 11, wherein the brace is an integral portion of the sheet of material of which the bracket body is comprised and extends perpendicularly from a plane defined by a length and a width of the sheet of material.

13. The stubout bracket of claim 1, wherein the crimpable ring is offset from a plane defined by a length and a width of the sheet of material of which the bracket body is comprised, to allow a narrow portion of a neck of a fitting to be slidably received in the notched out area.

14. The stubout bracket of claim 1, wherein there are two crimpable rings, the two crimpable rings being located on opposite sides of the notched out area.

15. The stubout bracket of claim 1, wherein the crimpable ring, before being crimped, does not extend into the notched out area, and therefore will not interfere with insertion of a pipe or fitting into the notched out area.

16. A method of supporting a pipe or fitting on a building member, comprising:

providing a bracket body including a sheet of material having a peripheral edge, a notched out area recessed into the edge of the sheet of material, the notched out area having an entrance zone adapted to receive the pipe or fitting, a crimpable ring located adjacent the edge of the sheet of material of which the bracket body is comprised, the crimpable ring being positioned immediately adjacent at one side of the notched out area and being coiled about an axis perpendicular to the peripheral edge;

positioning the pipe or fitting in the notched out area; and compressing the crimpable ring in a first direction and expanding the crimpable ring in a second direction toward the entrance zone of the notched out area such that the crimpable ring securely retains the pipe or fitting on the bracket.

17. A bracket assembly in combination, comprising:

a bracket body including a sheet of material having a peripheral edge, a notched out area recessed into the peripheral edge of the sheet of material, the notched out area having an entrance zone, a crimpable ring located adjacent the edge of the sheet of material of which the bracket body is comprised, the crimpable ring being positioned immediately adjacent the notched out area and being coiled about an axis approximately perpendicular to the peripheral edge; and a pipe or fitting received and secured in the notched out area by compressing the crimpable ring in a first direction and expanding the crimpable ring in a second direction toward the entrance zone of the notched out area such that the crimpable ring engages an outer surface of the pipe or fitting to fixedly retain the pipe or fitting on the bracket.

* * * * *